United States Patent
Hanson et al.

(10) Patent No.: US 11,853,188 B2
(45) Date of Patent: *Dec. 26, 2023

(54) METHOD FOR GENERATING POWER PROFILE IN LOW POWER PROCESSOR

(71) Applicant: Ambiq Micro, Inc., Austin, TX (US)

(72) Inventors: Scott Hanson, Morganville, NJ (US); RongKai Xu, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,570

(22) Filed: May 16, 2022

(65) Prior Publication Data
US 2023/0315600 A1    Oct. 5, 2023

Related U.S. Application Data

(63) Continuation of application No. 17/744,388, filed on May 13, 2022.

(60) Provisional application No. 63/327,249, filed on Apr. 4, 2022.

(51) Int. Cl.
*G06F 11/30*    (2006.01)
*G06F 11/32*    (2006.01)

(52) U.S. Cl.
CPC ...... *G06F 11/3062* (2013.01); *G06F 11/3013* (2013.01); *G06F 11/3072* (2013.01); *G06F 11/324* (2013.01)

(58) Field of Classification Search
None
See application file for complete search history.

(56) References Cited

U.S. PATENT DOCUMENTS

| 6,895,520 | B1 * | 5/2005 | Altmejd | G06F 1/3203 |
| | | | | 713/320 |
| 8,190,931 | B2 * | 5/2012 | Laurenti | G06F 11/348 |
| | | | | 713/340 |
| 8,656,220 | B2 * | 2/2014 | Lee | G06F 11/22 |
| | | | | 714/30 |
| 8,826,079 | B2 * | 9/2014 | Gilday | G06F 11/3636 |
| | | | | 714/25 |
| 9,195,524 | B1 * | 11/2015 | Wiesner | G06F 9/542 |
| 9,229,053 | B2 * | 1/2016 | Krishnani | G06F 1/329 |

(Continued)

FOREIGN PATENT DOCUMENTS

| CA | 2673852 A1 | 7/2008 |
| CA | 2917932 A1 | 1/2014 |

OTHER PUBLICATIONS

Non-Final Office Action dated Jul. 28, 2022, U.S. Appl. No. 17/744,388, 22 pages.

(Continued)

*Primary Examiner* — Matthew J Brophy
(74) *Attorney, Agent, or Firm* — Nixon Peabody LLP

(57) ABSTRACT

A method of determining power data of a system on a chip is disclosed. A plug-in module is provided for installation on the chip. The plug-in module is activated to take a snapshot of the data in power related registers of components on the chip when user provided software is executed on the system on a chip. The collected data is streamed to an external computing device. A spreadsheet of the collected register data may be displayed. A graphic representation of the collected register data may be displayed.

20 Claims, 9 Drawing Sheets

(56) References Cited

U.S. PATENT DOCUMENTS

| | | | |
|---|---|---|---|
| 9,344,079 B2* | 5/2016 | Kwon | G01R 19/2503 |
| 9,588,869 B2* | 3/2017 | Kumar | G06F 11/3612 |
| 9,684,367 B2* | 6/2017 | Hanssen | G06F 1/3296 |
| 9,852,040 B1* | 12/2017 | Munday | G06F 11/079 |
| 10,474,610 B1* | 11/2019 | Schelle | G06F 11/3636 |
| 10,541,042 B2* | 1/2020 | Nelson | G06F 11/3664 |
| 10,742,535 B2* | 8/2020 | Della Corte | H04L 43/067 |
| 10,831,625 B2* | 11/2020 | Dong | G06F 11/14 |
| 11,061,677 B1* | 7/2021 | Seth | G06F 8/441 |
| 11,216,053 B2* | 1/2022 | Seto | G06F 1/3206 |
| 11,307,882 B1* | 4/2022 | Zidenberg | G06F 9/45508 |
| 11,442,890 B1* | 9/2022 | Volpe | G06N 20/00 |
| 2003/0033132 A1* | 2/2003 | Algieri | G06F 30/00 703/22 |
| 2004/0019814 A1* | 1/2004 | Pappalardo | G06F 1/3237 713/300 |
| 2006/0036957 A1* | 2/2006 | Cho | G06Q 10/10 707/999.001 |
| 2006/0265610 A1* | 11/2006 | Kim | G06F 1/3243 713/300 |
| 2007/0202836 A1* | 8/2007 | Zaman | G06F 1/3203 455/343.2 |
| 2007/0282883 A1* | 12/2007 | Bolstad | G06F 16/258 |
| 2008/0104434 A1* | 5/2008 | May | G06F 1/3203 713/322 |
| 2008/0229130 A1* | 9/2008 | Guan | G06F 1/324 713/323 |
| 2010/0281309 A1* | 11/2010 | Laurenti | G06F 11/3636 714/45 |
| 2010/0318822 A1* | 12/2010 | Scandurra | G06F 1/3203 713/400 |
| 2013/0124478 A1* | 5/2013 | Ginzburg | G06F 40/18 707/639 |
| 2013/0205119 A1* | 8/2013 | Rajwar | G06F 11/28 712/208 |
| 2014/0115372 A1* | 4/2014 | Myrberg | G06F 11/3058 713/340 |
| 2014/0189104 A1* | 7/2014 | Dalton | G06F 11/3006 709/224 |
| 2015/0082441 A1* | 3/2015 | Gathala | H04L 63/1441 726/25 |
| 2015/0095338 A1* | 4/2015 | Baggott | G06F 11/3476 707/740 |
| 2015/0169531 A1* | 6/2015 | Campbell | G06F 3/0488 715/212 |
| 2015/0261648 A1* | 9/2015 | Malani | G06F 11/3062 703/21 |
| 2015/0301921 A1* | 10/2015 | Kumar | G06F 11/3072 714/38.1 |
| 2015/0378423 A1* | 12/2015 | Hanssen | G06F 1/3296 713/323 |
| 2016/0085655 A1* | 3/2016 | Ito | G06F 11/3058 702/186 |
| 2019/0018747 A1* | 1/2019 | Dong | G06F 11/14 |
| 2019/0163250 A1* | 5/2019 | Lee | G06F 1/3206 |
| 2019/0245768 A1* | 8/2019 | Della Corte | H04L 43/067 |
| 2019/0294125 A1* | 9/2019 | Deka | G06F 11/3055 |
| 2020/0383019 A1* | 12/2020 | Yao | H04W 80/08 |
| 2021/0141438 A1* | 5/2021 | Seto | G06F 11/3062 |
| 2021/0405732 A1* | 12/2021 | Amireddy | G06F 1/3218 |
| 2022/0156217 A1* | 5/2022 | Pallardy | G06F 13/362 |

OTHER PUBLICATIONS

Streif, "Microcontroller versus System-on-Chip in Embedded System Designs", Sep. 2019, Beeto Technology Corner, 10 pps.

Rick Leatherman et al., "Method offers snapshot of SoC operation", Apr. 18, 2003, EETimes, Designlines, Wireless and Networking Designline, 6 pps.

* cited by examiner

METHOD FOR GENERATING POWER PROFILE IN LOW POWER PROCESSOR

PRIORITY CLAIM

The present disclosure is a continuation of U.S. application Ser. No. 17/744,388, filed on May 13, 2022, which claims priority from U.S. Provisional Application No. 63/327,249 filed on Apr. 4, 2022. The contents of both of these applications are hereby incorporated by reference in their entireties.

TECHNICAL FIELD

The present disclosure relates generally to system on chip microcontrollers. More particularly, aspects of this disclosure relate to a system that uses software to analyze register data to produce a power profile.

BACKGROUND

In recent years, due to the growth of portable electronics, there has been a push to decrease the power used by microcontrollers (or "MCU"), microprocessors, application processors, digital signal processors (DSPs), neural processing units (NPUs), and other circuits used in portable electronic appliances. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuit.

One method for reducing microcontroller power relies on hardware or software-based power mode switching. Power modes can be selected for microcontroller components or resources based on operating state, operating conditions, and/or sleep cycle characteristics and other factors to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

One challenge is the power profile for a system on chip microcontroller to ensure the chip is functioning properly and the power modes are operating efficiently to maximize power savings. Currently, a chip user must provide software to program the chip the specific user requirements for the installation of the chip in different power efficiency devices/applications such as wearable devices, smart cards, Internet of things devices, and hearables. The software provided by the user may be executed on the chip dictates the power consumed by the device. However, actual power consumption of chip depends largely on the user software. In order to determine true power consumption, the power consumption of the chip executed the user software must be measured. The power consumption output of the chip executing the user software may then be compared to the expected consumption values on a data sheet. If a deviation is determined from the software execution, it is a challenge to determine what is causing the deviation and debug the problem within the user software and or user hardware that is integrated with the chip.

Power debugging that shows power anomalies in a chip is indicative of an issue in the user software executed by the chip. It is a challenge to find every issue causing power consumption abnormalities from user software without more detailed analysis. Traditional methods of power analysis are disruptive as the normal flow of chip operation is disrupted to set a break point and use a software tool to read out the variable readings. Typically, an oscilloscope must be connected to the chip to determine power readings to perform power analysis. Such traditional methods make it difficult or impossible to debug special power scenarios like a deep sleep mode or dynamically changing code such as inside interrupt routines.

One method is to insert different break points within the software code installed on a chip. However, a break point inside the code, might change the power load and thus the cached data at the break point may not accurately capture the power load. For example, if the load is dynamically changing and the break point is set during certain modes, such as a sleep, hibernation mode, or interrupt mode, the break point might never trigger. In this case, the code never breaks, so the user can keep running the scenarios without any insight as to the power disparities from the datasheet. Another deficiency in traditional debugging is that known analysis only determines average power measurement without indicating potential huge power fluctuations during different scenarios, which might occur at a relatively short period.

Thus there is a need for a plug-in module that can capture snapshots of power data from components on a system on chip independent of user software executed by the chip. There is a further need for a power analysis tool that can compare data from different snapshots to show changes of power in the components of the chip. There is a further need for a tool that allows for visual displays of relevant power data to facilitate power analysis.

BRIEF DESCRIPTION OF THE DRAWINGS

The disclosure will be better understood from the following description of exemplary embodiments together with reference to the accompanying drawings, in which.

Figure 1A:
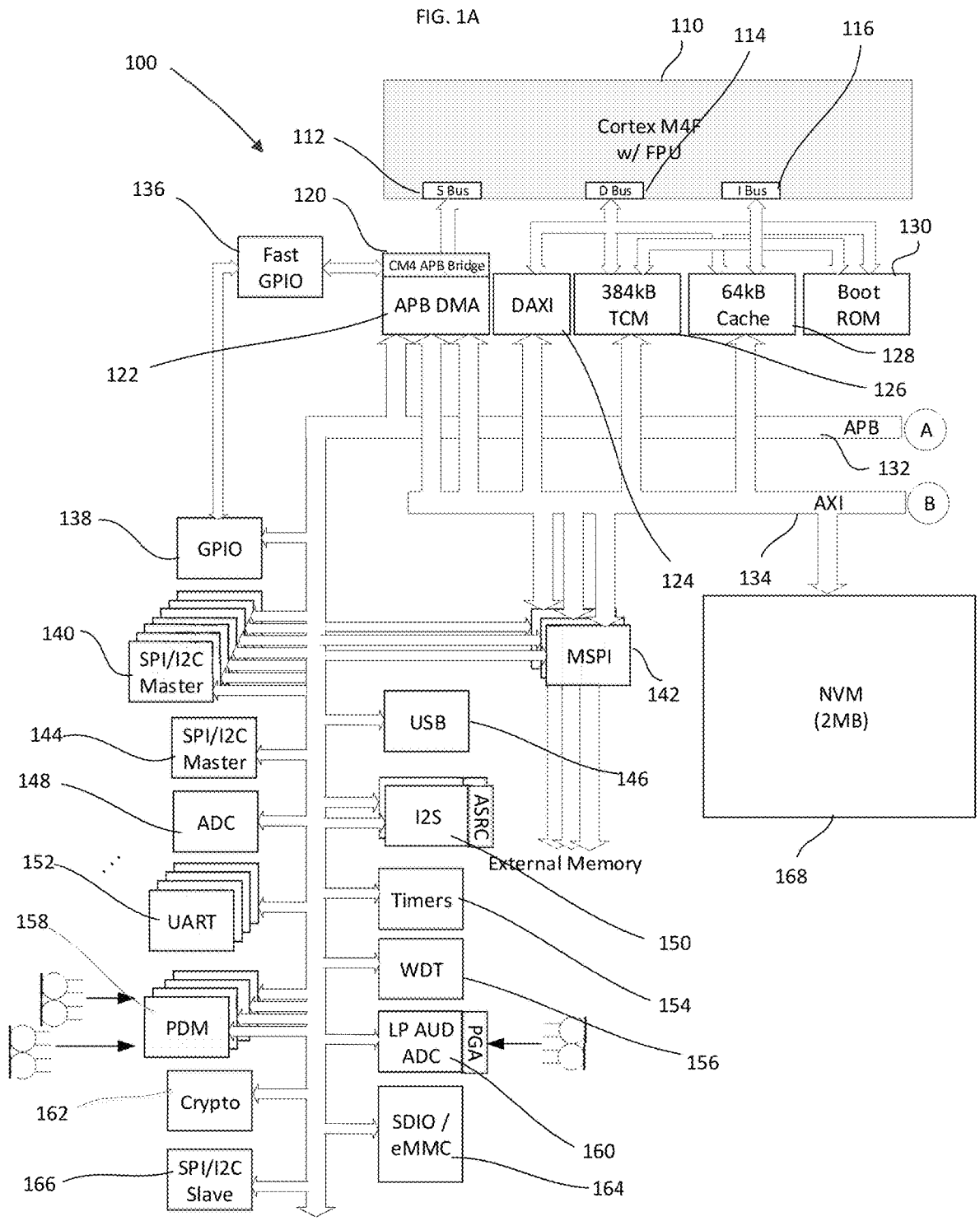
FIG. 1A-1B is a block diagram of the example low power microcontroller system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a system on a chip including a plug-in module executed by a processor on the chip to collect a snapshot of register data of components on the chip associated with power consumption by the system during a certain time. The system includes an external device interface allowing the streaming of collected register data to an external computing device.

Another disclosed example is a system of determining a power profile of a system on a chip executing user provided software. The system includes a plug-in module executed by a processor of the system to collect a snapshot of register data of components on the chip associated with power consumption by the system during a certain time. The system includes an interface link and an external computing device coupled to the interface link. The external computing device is operable to execute a data parser module to receive the streamed collected register data; and a display module to display a graphic representation of the snapshot of register data.

Another disclosed example is a non-transitory computer readable medium having stored thereon software instructions that, when executed by a processor, cause the processor to execute user provided software on a chip having a microcontroller system. The instructions also cause the processor to activate a plug-in module to take a snapshot of the data in power related registers of components on the chip. The instructions also cause the processor to stream the collected data to an external computing device.

Another disclosed example is a method of determining power data of a system on a chip. A plug-in module is provided for installation on the chip. The plug-in module is activated to take a snapshot of the data in power related registers of components on the chip when user provided software is executed on the system on a chip. The collected data is streamed to an external computing device.

A further implementation of the example method includes displaying the collected register data on the external computing device. Another implementation is where the displaying includes receiving the streamed collected register data via a data parser module. Another implementation is where the displaying is performed by a display module that is one of: a spreadsheet generator module creating a spreadsheet of the collected register data; or an interface module displaying a graph of power consumption from the collected register data. Another implementation is where the data parser converts the collected data in one of a binary data format or a JSON format. Another implementation is where the spreadsheet groups the register data of the snapshot by component groups. Another implementation is where the example method includes collecting a plurality of snapshots of register data, and the spreadsheet includes the register data collected from each of the plurality of snapshots. Another implementation is where changes in register values between snapshots are highlighted on the spreadsheet. Another implementation is where the interface generator generates a graphic representation of power consumption by components based on the collected register data of the snapshot. Another implementation is where the user provided software accesses an API call to activate the plug-in module. Another implementation is where the register data includes at least one of whether a component is turned on, clock rate, clock speed, power mode, or power measurements. Another implementation is where the streaming is performed via a serial port. Another implementation is where the collected register data is streamed to the external computing device when the plug-in module collects the snapshot. Another implementation is where the example method includes storing the snapshot in a memory on the system on chip and the external device streams the collected register data from the memory. Another implementation is where the example method includes erasing the collected register data stored in the memory after streaming the collected register data. Another implementation is where the example method includes identifying a mode setting on a component on the chip based on the collected data; and adjusting the mode setting to reduce power consumption of the component. Another implementation is where one of the components is an audio output device.

Another disclosed example is a method of determining power data of a system on a chip. A plug-in module is provided for installation on the chip. The plug-in module is activated to take a snapshot of the data in power related registers of components on the chip. The collected data is streamed to an external computing device. The collected data is displayed on the external computing device.

A further implementation of the example method is where the displaying the collected data includes at least one of displaying the data in a spreadsheet displaying a graph of power consumption of the components.

Another disclosed example is a method of displaying power data of a system on a chip. A snapshot is received from a plug-in module installed on the chip. The snapshot includes data in power related registers of components on the chip at a period of time. The collected data is displayed on the external computing device.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a power evaluation tool for a low power microcontroller system on a chip.

The power evaluation tool includes a plug-in module that collects power related data from the registers of various components on the microcontroller system. The plug-in module may take different snapshots or data from the registers while the chip is operated. Additional modules allow the analysis of the snapshot data on an external computing device. The software module also may provide a detailed analysis in a GUI (Graphical User Interface) displayed on an external computer with color-coded heatmaps for each snapshot taken for a user to quickly identify function blocks on possible power issues from executing of user software on the chip. Thus, the tool provides power analysis for the execution of any type of software on the chip to facilitate debugging.

Figure 1B:
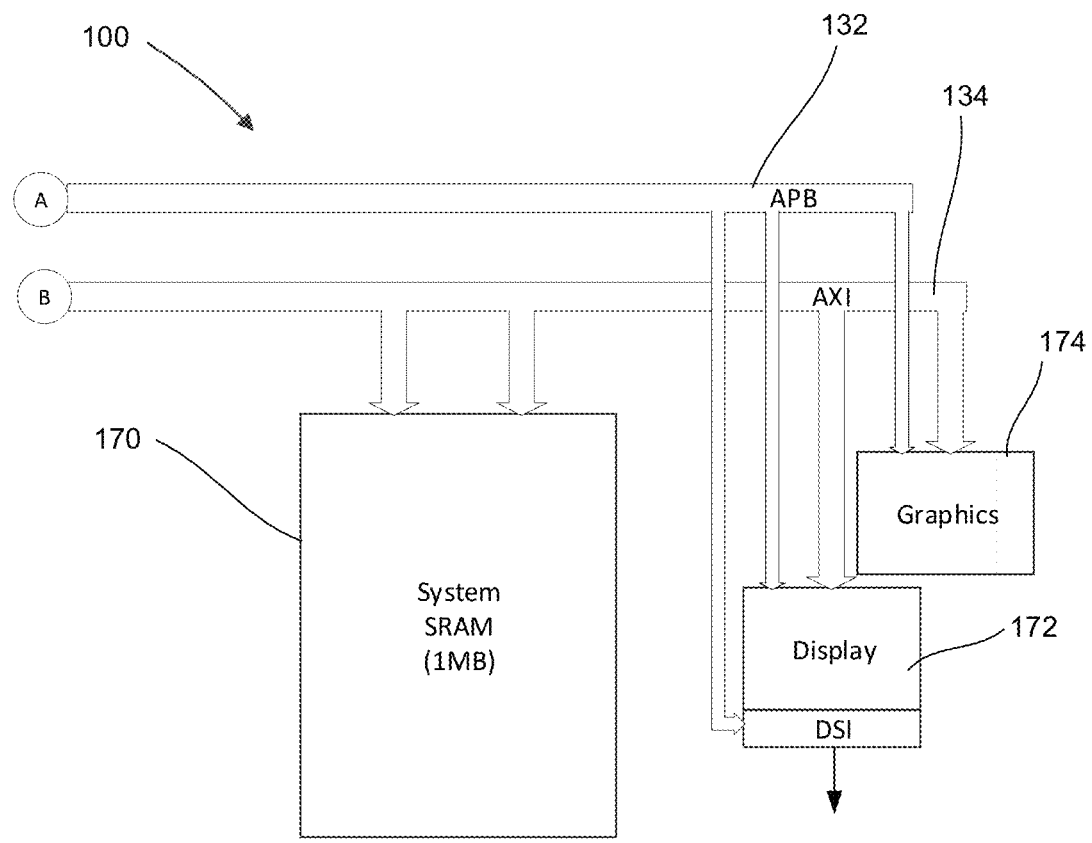

FIGS. 1A-1B are a block diagram of an example low power microcontroller system 100. The example low power microcontroller system 100 includes a central processing unit (CPU) 110. The CPU 110 in this example is Cortex M4F (CM4) with a floating-point unit. The CPU 110 includes a System-bus interface 112, a Data-bus interface 114, and an Instruction-bus interface 116. It is to be understood, that other types of general CPUs, or other processors such as DSPs or NPUs may incorporate the principles described herein.

The System-bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, the cache 128, and the boot read only memory (ROM) 130. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the SRAM and the MSPIs.

An APB 132 and an Advanced eXtensible Interface (AXI) bus 134 are provided for communication between components on the microcontroller system 100. The APB (Advanced Peripheral Bus) is a low speed and low overhead interface that is used for communicating with peripherals and registers that don't require high performance and don't change often (e.g., when a controller wants to set configuration bits for a serial interface). The AXI bus 134 is an ARM standard bus protocol that allows high speed communications between multiple masters and multiple busses. This is useful for peripherals that exchange large amounts of data (e.g., a controller that talks to an ADC and needs to transfer ADC readings to a microcontroller or a GPU that talks to a memory and needs to transfer a large amount of graphics data to/from memories).

A fast general-purpose input/output (GPIO) module 136 is coupled to the APB bridge 120. A GPIO module 138 is coupled to the fast GPIO module 136. The APB bus 132 is coupled to the GPIO module 138. The APB bus 132 is coupled to a series of Serial Peripheral Interface/Inter-Integrated Circuit (SPI/I2C) interfaces 140 and a series of Multi-bit Serial Peripheral Interfaces (MSPI)s 142. The MSPIs 142 are also coupled to the AXI bus 134 and provide access to external memory devices.

The APB bus 132 also is coupled to a SPI/I2C interface 144, a universal serial bus (USB) interface 146, an analog to digital converter (ADC) 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system non-volatile memory (NVM), which is 2 MB in size in this example, is accessible through the AXI bus 134. A system static random-access memory (SRAM) 170, which is 1 MB in this example is accessible through the AXI bus 134. The microcontroller system 100 includes a display interface 172 and a graphics interface 174 that are coupled to the APB bus 132 and the AXI bus 134.

Components of the disclosed microcontroller system 100 are further described by U.S. Provisional Ser. No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

Figure 2:
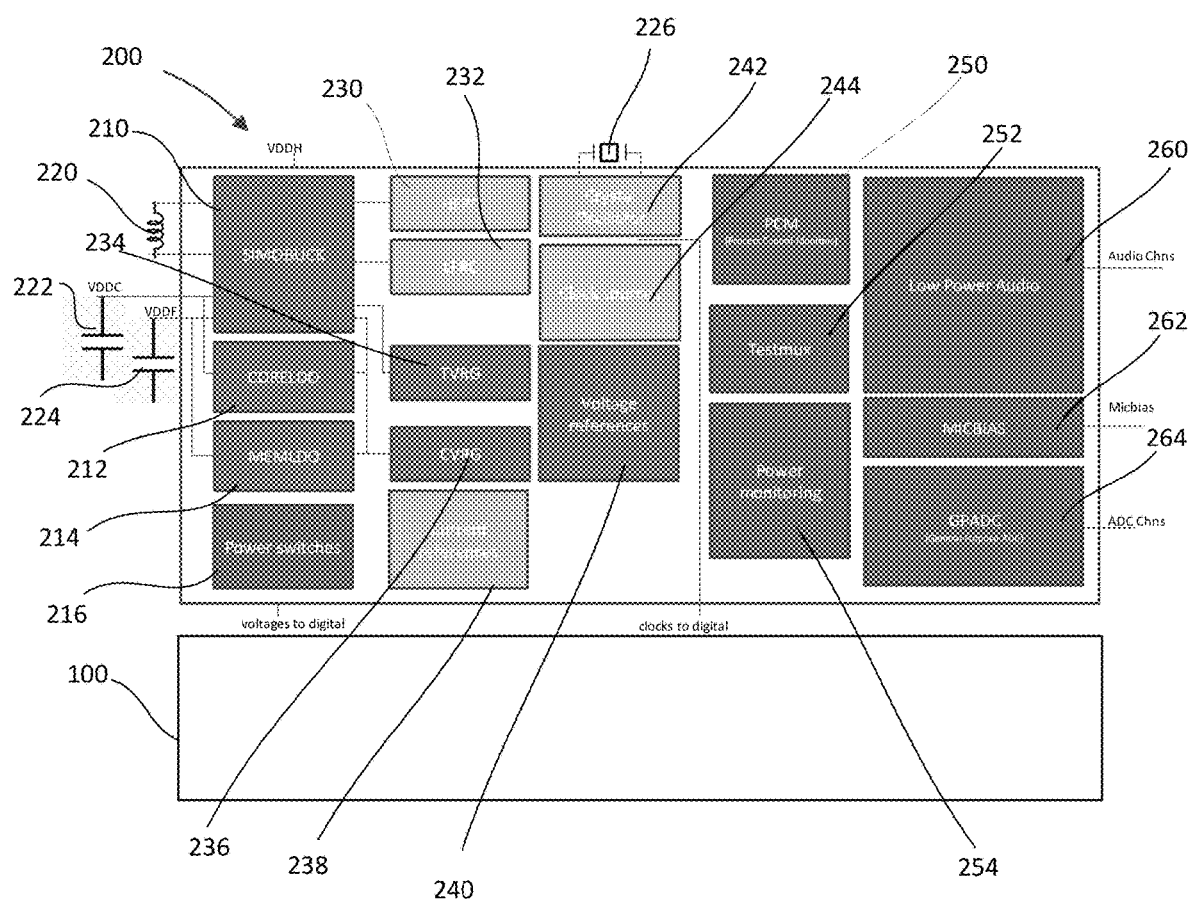
FIG. 2 is a block diagram of an example analog module that supplies power, external signals, and clock signals to the low power microcontroller system in FIG. 1.

FIG. 2 shows a block diagram of an analog module 200 that interfaces external components with the microcontroller system 100 in FIG. 1. The analog module 200 supplies power to different components of the microcontroller system 100 as well as providing clocking signals to the microcontroller system 100. The analog module 200 includes a Single Inductor Multiple Output (SIMO) buck converter 210, a core low drop-out (LDO) voltage regulator 212, and a memory LDO voltage regulator 214. The LDO voltage regulator 212 supplies power to processor cores of the microcontroller system 100, while the memory LDO voltage regulator 214 supplies power to volatile memory devices of the microcontroller system 100 such as the SRAM 170. A switch module 216 represents switches that allow connection of power to the different components of the microcontroller system 100.

The SIMO buck converter module 210 is coupled to an external inductor 220. The module 200 is coupled to a Voltage dipolar direct core (VDDC) capacitor 222 and a voltage dipolar direct flash (VDDF) capacitor 224. The VDDC capacitor 222 smooths the voltage output of the core LDO voltage regulator 212 and the SIMO buck converter 210. The VDDF capacitor 224 smooths the voltage output of the memory LDO voltage regulator 214 and the SIMO buck converter 210. The module 200 is also coupled to an external crystal 226.

The SIMO buck converter 210 is coupled to a high frequency reference circuit (HFRC) 230, a low frequency reference circuit (LFRC) 232, and a temperature voltage regulator (TVRG) circuit 234. The HFRC provides all the primary clocks for the high frequency digital processing blocks in the microcontroller system 100 except for audio, radio and high power mode clocks. In this example, the LFRC oscillator includes a distributed digital calibration function similar to that of the external oscillator. A compensation voltage regulator (CVRG) circuit 236 is coupled to the SIMO buck converter 210, the core LDO voltage regulator 212, and the memory LDO voltage regulator 214. Thus, both trim compensation and temperature compensation are performed on the voltage sources. A set of current reference circuits 238 is provided as well as a set of voltage reference circuits 240. The reference circuits 238 and 240 provide stable and accurate voltage and current references, allowing the maintenance of precise internal voltages when the external power supply voltage changes.

In this example, the LDO voltage regulators 212 and 214 are used to power up the microcontroller system 100. The more efficient SIMO buck converter 210 is used to power different components on demand.

A crystal oscillator circuit 242 is coupled to the external crystal 226. The crystal oscillator circuit 242 provides a drive signal to a set of clock sources 244. The clock sources 244 include multiple clocks providing different frequency signals to the components on the microcontroller system 100. In this example, three clocks at different frequencies may be selectively coupled to drive different components on the microcontroller system 100.

The analog module 200 also includes a process control monitoring (PCM) module 250 and a test multiplexer 252. Both the PCM module 250 and the test multiplexer 252 allow testing and trimming of the microcontroller system 100 prior to shipment. The PCM module 250 includes test structures that allow programming of the compensation voltage regulator 236. The test multiplexer 252 allows trimming of different components on the microcontroller system 100. The analog module 200 includes a power monitoring module 254 that allows power levels to different components on the microcontroller system 100 to be monitored. The power monitoring module 254 in this example includes multiple state machines that determine when power is required by different components of the microcontroller system 100. The power monitoring module 254 works in conjunction with the power switch module 216 to supply appropriate power when needed to the components of the microcontroller system 100. The analog module 200 includes a low power audio module 260 for audio channels, a microphone bias module 262 for biasing external microphones, and a general-purpose analog to digital converter 264.

Examples of the present disclosure include a power profiling software/firmware tool that may capture power profiles of different components on a microcontroller system such as the system 100 in FIGS. 1A-1B and relevant analog components in FIG. 2. The power profiling tool provides a non-invasive and non-disruptive way to capture multiple time-stamped snapshots of real-time power registers for the components of an entire chip without disrupting the work flow. The software module is a closed-loop routine and allows self-diagnosis. The example power profiling tool extracts data from the current microprocessor power registers and states to help users debug any power problems, such as anomalies in normal operation, deep sleep, or lower power modes.

The snapshots may be captured in a single run. The plug-in module collects power related data from registers of components on the chip and streams out the power related data over an external device interface such as a serial port driven by one of the UARTs 152 in FIG. 1A. The data may thus be streamed to an external computing device for power analysis purposes.

The disclosed software module senses the sequentially captured data during one single run in application code executed by the microcontroller system 100, and may provide the captured data in a single spreadsheet. The software module automatically highlights the differences between previous and current stages/snapshots. Usually, this difference between snapshots is an indication of causes of power fluctuations in the components in the microcontroller system 100. The software module also may provide a detailed analysis in a GUI (Graphical User Interface) displayed on an external computer with color-coded heatmaps for each snapshot taken for a user to quickly identify function blocks on possible power issues on execution specific software provided by the user by the microcontroller system 100.

Figure 3:
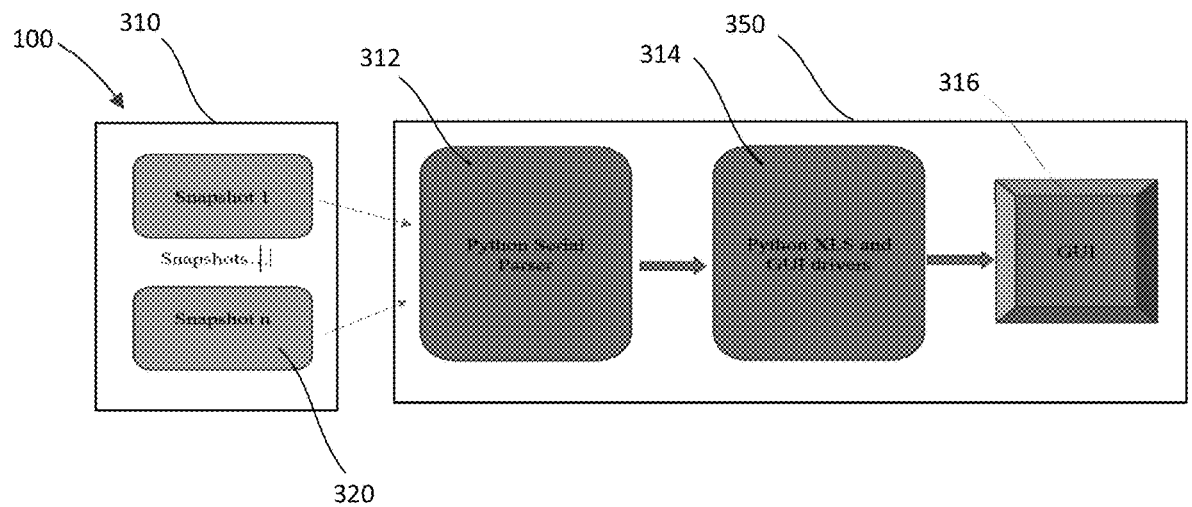
FIG. 3 is a schematic block diagram of a power profiling system.

FIG. 3 is a block diagram of a power evaluation tool 300 used in conjunction with user provided software executed by the microcontroller system 100 in FIGS. 1A-1B. In this example, the power evaluation and profiling tool 300 may include a plug-in module 310 that may be provided to a chip user to be installed with user software on the microcontroller system 100. Alternatively, the plug-in module 310 may be provided in firmware by the chip manufacturer, or as part of a specialized circuit on the microcontroller system 100 that may be accessed by the user software.

The example power evaluation tool 300 has four core modules: the Plug-in module 310, a serial driver and JSON parser module 312, an XLS generator module 314, and an interface module 316. In this example, the modules 310, 312, 314 and 316 are coded in C and Python, but any appropriate programming language may be used. Thus, the example Plug in module 310 is written in C code; the example serial driver and JSON parser 312 is written in Python; the example XLS generator and formatting module 314 are written in Python; and the interface module 316 is written in Python. In this example, the plug-in module 310 is executed by a processor core or controller in the microcontroller system 100. The other modules 312, 314, and 316 are installed on and executed by a processor on an external computing device 350 such as a laptop computer, desktop computer, tablet or workstation. In this example, the external computing device 350 includes a serial port that may be connected to a serial port on the microcontroller system 100 that receives the snapshot data collected by the plug-in module 310. Of course, other types of wired ports may be used. Alternatively, the data from the plug-in module 310 may be wirelessly transmitted from the microcontroller system 100 to the external computing device 350. In this example, the modules 314 and 316 are each display modules that graphically display the collected register data on a display. As will be explained the XLS generator and formatting module 314 creates a spreadsheet of the collected register data in JSON while the interface module 316 displays a graph of power consumption from the collected register data. Other binary data formats may be used instead of JSON.

In this example, the tool 300 is activated by a simple API call such as am_bsp_pp_snapshot (bool bSingleshot, uint32_t sNumber, bool bStreamNow) from the user provided software executed by the microcontroller system 100. In the example API call, Boolean variables set by the user define whether a single snapshot is taken or the number of snapshots as well as whether the power data collected will be streamed in real-time or at a later time to the external device. In the example API call, the sNumber is a user defined snapshot number, which can be used to simulate the software breakpoint. The Singleshot mode is usually intended for one-time capture only, and setting the mode to false enables the user to capture the snapshots continuously inside the user application loops.

The plug-in module 310 captures a series of snapshots of power register data 320 from different components of the microcontroller system 100 and the analog module 200. Thus each snapshot is a set of register data relating to power such as blocks turned on, clock rate, clock speed, power mode, and feedback of power measurements from components on the microcontroller system 100 and the analog module 200 in FIG. 2. The plug-in module 310 automatically captures all snapshots in one pass and the other modules of the power evaluation tool 300 sequentially compare the captured snapshots 320 to previous sets of snapshots.

The example power evaluation tool 300 has two modes. A continuous capturing mode allows a predetermined number of snapshots to be captured over a predetermined amount of time. The resulting register data collected in each snapshot may be streamed out to the external device 350. As will be explained, the tool 300 automatically highlights changes in register values between snapshots. A single shot mode allows a single snapshot of register data to be captured by the plug-in module 310. The example power evaluation tool 300 has two operating modes. A first operating mode is a streaming mode that streams the data from the plug-in module 310 directly to the external computing device 350. A second operating mode is a buffering mode where the register values are stored in on-board memory such as flash memory on the CPU 110 or on the chip itself. The collected data may them be sent to the external computing device 350 at a later time. In cases where multiple snapshots are captured, snapshots may be temporarily stored in the memory and after the data in the snapshot is streamed, the memory space is then freed and reused for subsequent snapshots.

Figure 4:
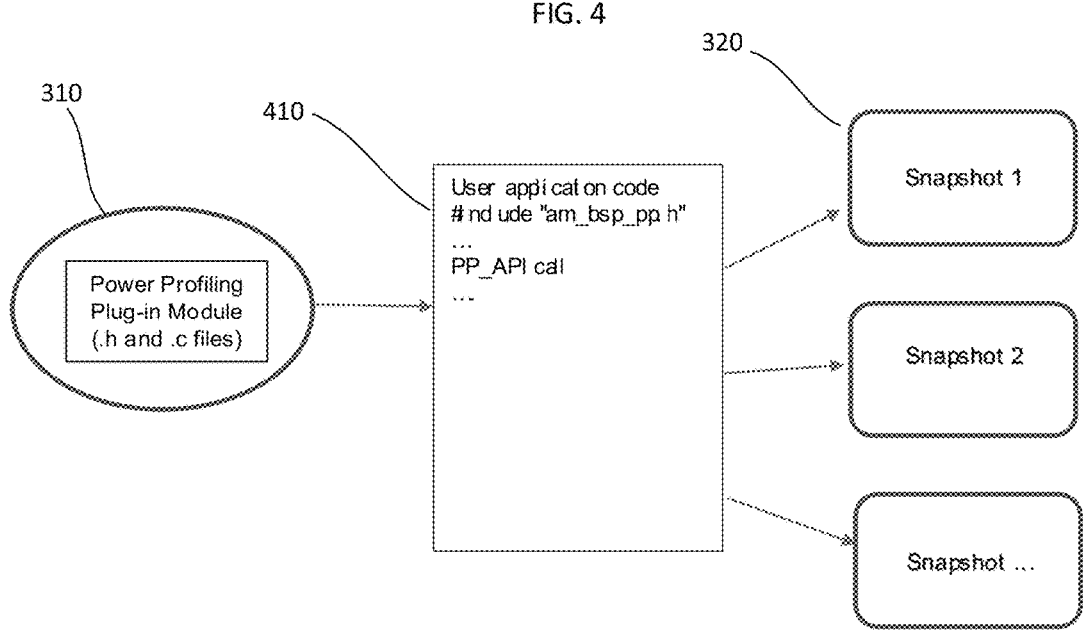
FIG. 4 is a schematic block diagram of the plug-in module of the system in FIG. 3.

FIG. 4 is a schematic block diagram of the plug-in module 310 of the system in FIG. 3 in relation to user provided software 410 executed by the microcontroller system 100. The user software 410 may be ported to the microcontroller system 100 during a provisioning process and is provided by a user to program the microcontroller system 100 to perform user desired functions. The user application software 410 may be written to create an API call to activate the plug-in module 310 to gather the snapshot data 320. Thus, a user resets the targeted chip and starts the embedded program, as well as launching software on the external computing device 240 to receive data from the serial port and wait for the captured snapshot data. In this example, the plug-in module 310 is Representational State Transfer (REST) API ready and thus may support cloud-based remote deployment and diagnostics in the form of the other modules 312, 314, and 316. The recommended settings of the example tool may be tailored to the user software 410. This can be done by manually. The plug-in module can be triggered by the user software 410 in different configuration such outputting a single shot or continuous shots of the data with a Delta feature that allows changes between snapshots to be viewed.

In this example, the plug-in module 310 runs on a suitable processor on board the microcontroller system 100 and is activated by the user software 410. The plug-in module 310 generates an output containing a power profiling snapshot of register data at the time the module 310 is activated. The power profiling snapshot has all the power-related information of that specific time for each register of relevant power consumption components of the microcontroller 100 and the analog module 200. An alternative mode is a continuous mode that takes snapshots over a predetermined period of time and stores each set of data in memory for later analysis. The output of the continuous mode is useful for high-speed or time-sensitive debugging. The data may be provided dynamically with a user defined label and timestamp for easy program flow reconstruction. Such labels may be provided on the spreadsheet output as explained below. Certain registers will indicate whether the component is turned on or off during the snapshot. Other registers may indicate the power consumption of certain components such as power status for peripherals. For example, a hardware register for a buck converter that provides a counter for each cycle may be read and the average power consumption may be output by inputting the counter value and the time period. The example tool provides real-time clock (RTC) time-stamped snapshots, and the user can provide customized labels (e.g., "before interrupt" to easily tell the location) for each snapshot.

In this example, the plug-in module 310 is in a board support package (BSP) that is pre-defined for the user by the vendor of the chip with the microcontroller system 100 and the analog module 200. The BSP may thus be integrated into the user provided software 410. In this example, the system user activates the plug-in module 310 through the user provided software 410. The user configures a port during the startup stage to ensure the modules of the power evaluation tool 300 on the external computing device 350 can receive the data from the registers of the components on the chip via the plug-in module 310. In this example, the plug-in module 310 has a setting for the serial port that must match the corresponding port on the external computer 350. The plug-in module 310 has an automatic trigger feature that provides information to the delta generator in the XLS generator module 314. The delta shows changes between snapshots and is activated by configuring the delta option.

In this example, a software driver is executed on the host computer 350 to facilitate the other modules of the power evaluation tool 300. In this example, the host computer may be any external computing device such as a desktop, a workstation, a tablet, a smartphone, and like devices. The software drivers in this example include the serial driver from a Python library, but other drivers may be used. The external computing device 350 executes the software driver to allow the external computing device 350 to collect and parse the snapshots from the plug-in module 310 based on the modules 312, 314, and 316. The collected data may be uploaded to a network storage system such as the Cloud. The ability to store the data in a network storage system is helpful for field application engineers (FAEs) employed by the chip vendor to assist users of the chip with the microcontroller system 100 without requiring access to the often propriety user software installed by the user on the microcontroller system 100. FAEs may thus simply download the power data collected by the example tool 300 stored in the Cloud to perform analysis of the chip executing the user software.

In this example, the external computing device 350 also executes the software application component of the tool 300 to translate and display the snapshot data on a receiving terminal (which can be the same as the host computer). In this example, the example tool 300 highlights the differences in power registers for sequential snapshots and provides recommendations for the user to fix the issues.

The tool 300 highlights the power registers setting differences for each sequentially captured snapshot via a visible format such as a spreadsheet. The highlighted differences aid a user to identify the potential issues for analysis and trouble shooting. Differences may be color-coded and divided into profiling power zones such as clocks, memories, processors, voltage sources, and the like. The register data may be input into calculation functions to obtain additional data such as a weighted relative reading of power of the system or individual components. For example, if a peripheral clock is enabled at twice the rate of the main clock, and power consumption is similar, a weighted power is provided as a factor of 3 (2+1, 2 represents the enabling of the peripheral clock at twice the rate and a general power factor is 1).

In this example, the example tool 300 may provide recommendations for the user to fix the issue (e.g., ask permissions). Such recommendations may be associated with specific registers that may deviate from an expected value and relate to possible settings for components to reduce power in certain predetermined scenarios. The example tool 300 may be configured to only output data for certain components e.g., those related to audio or media drivers, those related to memory, and the like.

Figure 5:
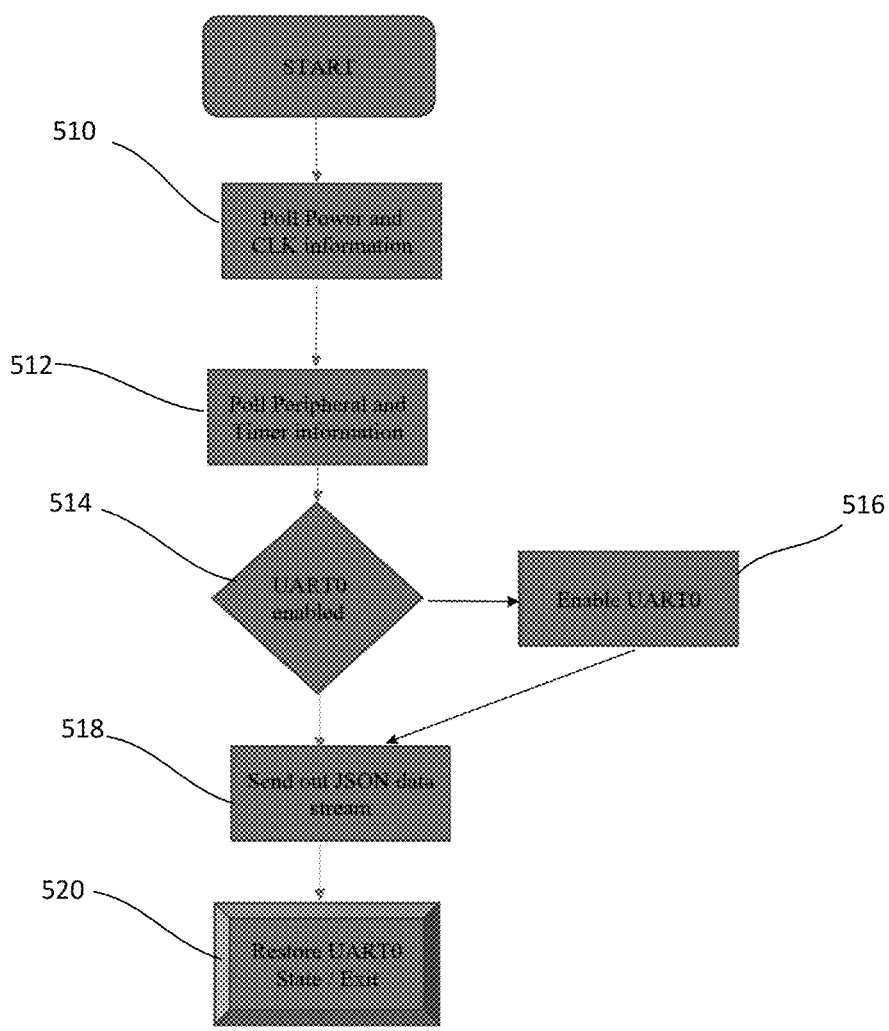
FIG. 5 is a block diagram of the routine executed in FIG. 3 to capture a snapshot of power consumption.

FIG. 5 is a flow diagram of the process of taking a single snapshot using the power evaluation tool 300 in FIG. 3. The flow diagram in FIG. 5 is representative of example machine readable instructions for collecting a single snapshot of power related data from the microcontroller system 100. The example routine 500 is simply triggered multiple times when the continuous mode is selected to collect multiple snapshots of power related data.

In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

In this example, the routine is started in the plug-in module 310 on activation from the user provided software executed by the microcontroller system 100. The routine first polls power and clock data from the designated registers of all components associated with power consumption on the microcontroller system 100 (510). The routine then polls peripheral and timer data such as timer settings, clocks, and other data from the designated registers. (512). The routine then determines whether the UART0 register is enabled to start the serial connection between the microcontroller 100 and the external computing device 350 (514). If the register is not enabled, the routine will enable the UART0 register (516). The routine then will send out a JSON data stream with the polled power, clock, peripheral and timer information to the external device (518). The routine then will restore the UART0 register to the non-enabled state (520).

Figure 6A:
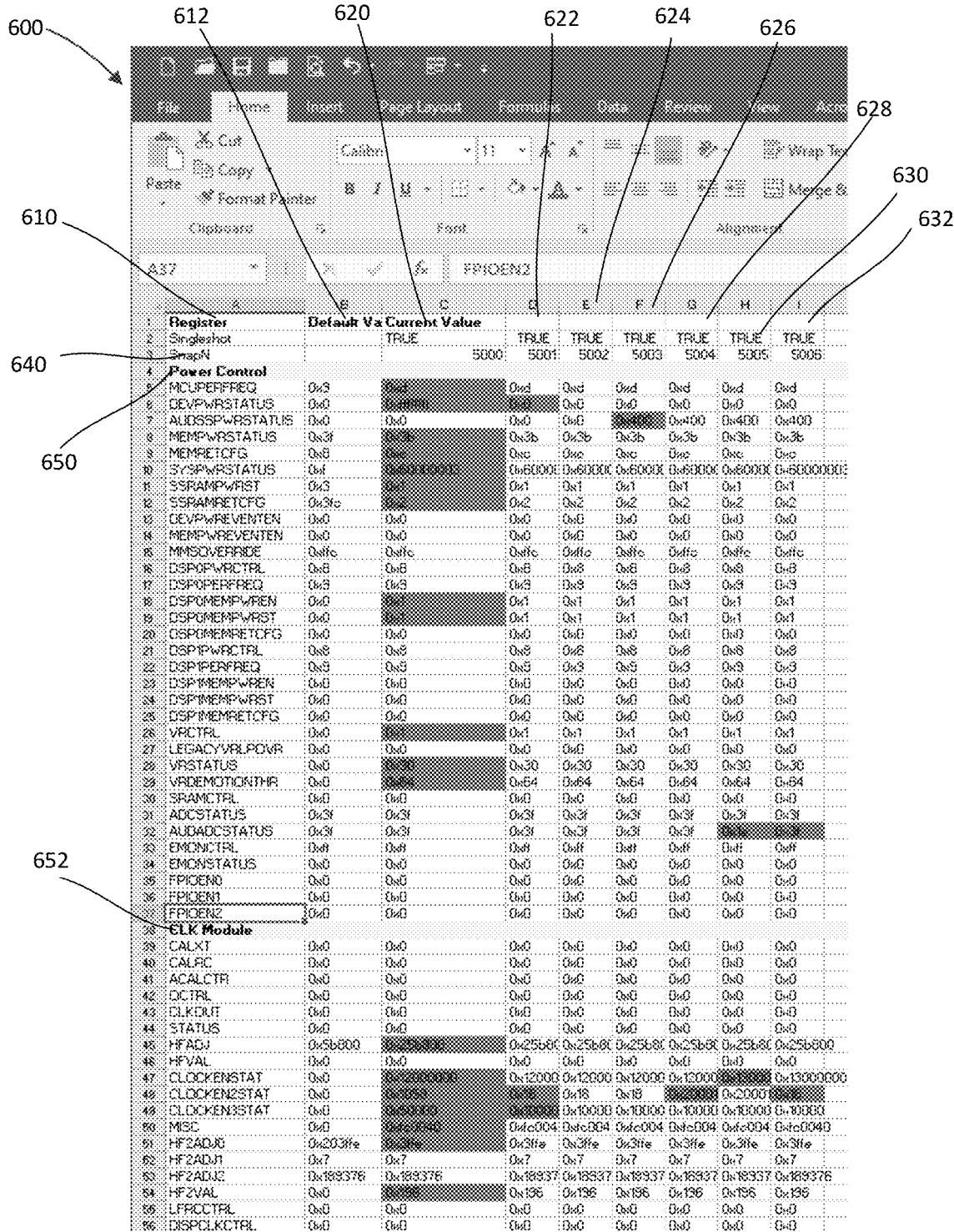
FIGS. 6A-6C are an example spreadsheet output of the power profiling system in FIG. 3.
Figure 6B:
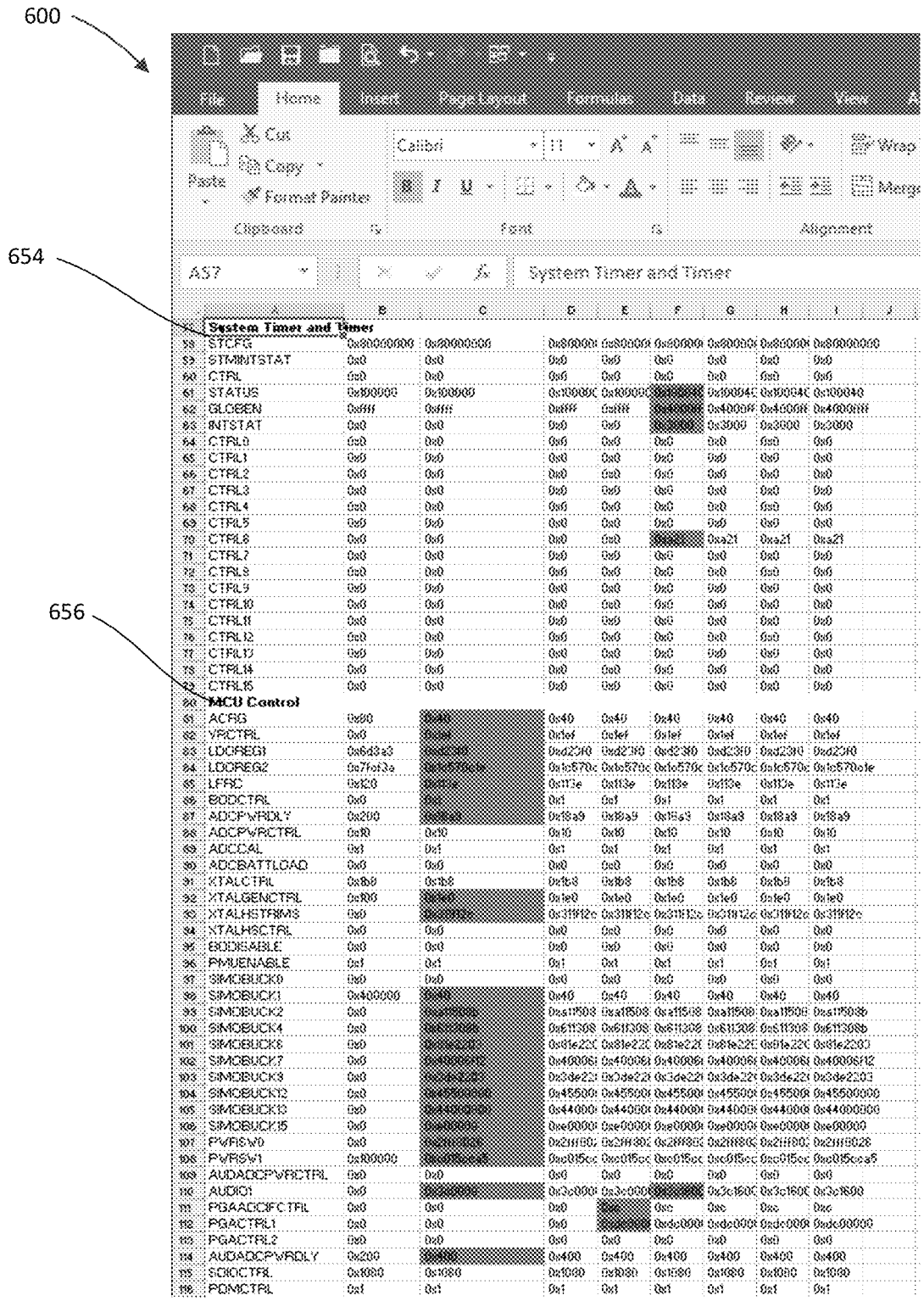
Figure 6C:
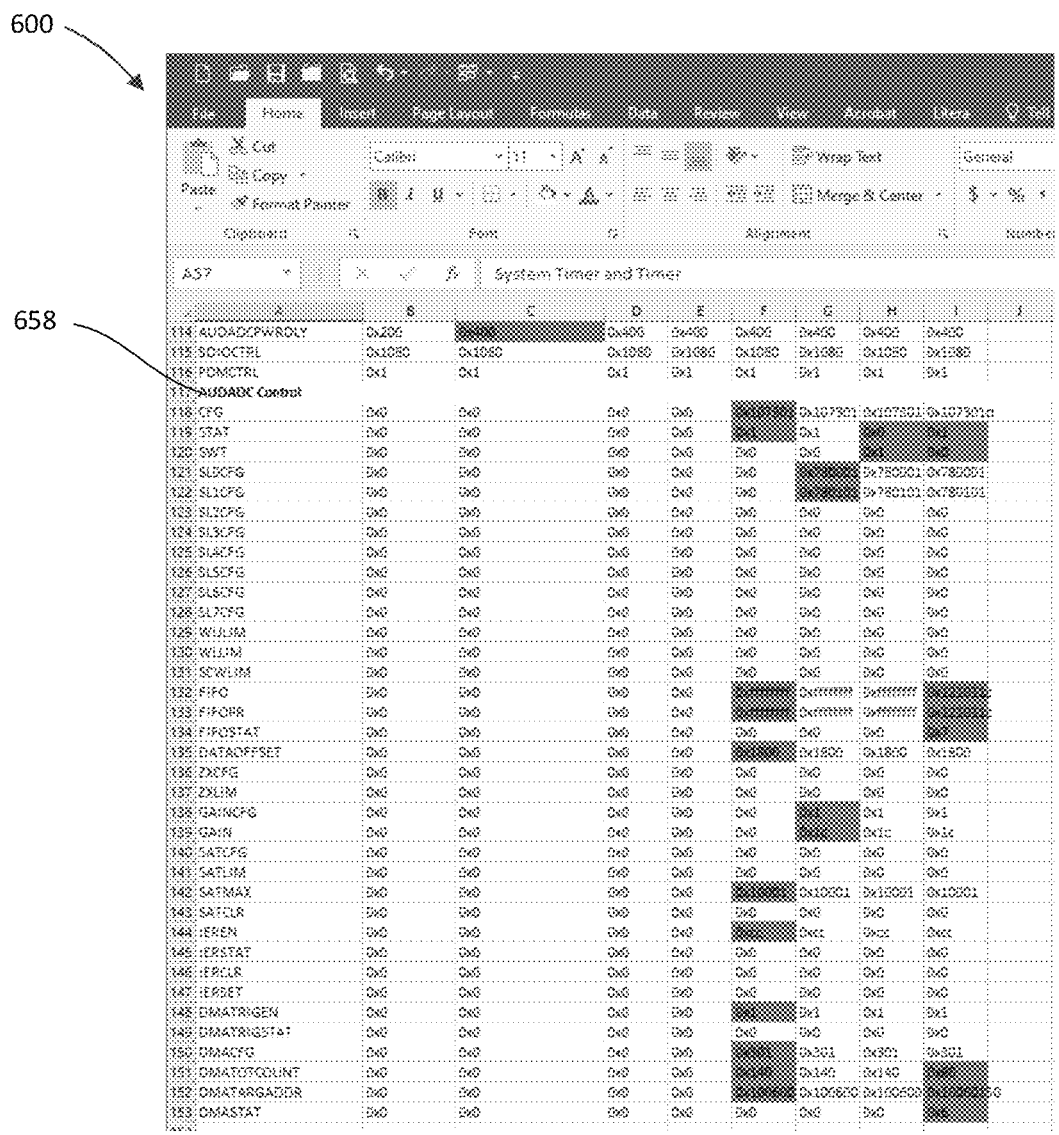

FIG. 6 is an example spreadsheet 600 that demonstrates outputs of the power profiling tool 300 in FIG. 3 on an external device such as the external computing device 350. The spreadsheet 600 is an output generated by the XLS generator module 314. A first column 610 of the spreadsheet includes the names of the component where register data was collected. A second column 612 shows the default value of the corresponding register. Subsequent columns 620, 622, 624, 626, 628, 630, and 632 show the current register values collected during a snapshot corresponding to the columns 620, 622, 624, 626, 628, 630, and 632. A row 640 shows the sequence number of each of the snapshots. In this example, the sequence numbers range from 5000 to 5006, but any suitable, preferably sequential, range of numbers may be used. Thus, the spreadsheet 600 includes different columns that represent the register values for each snapshot collected by the plug-in module 310. In this example, there are 7 snapshots listed, but any number of snapshots may be collected depending on the user setting for the module 310. Typically, 4-20 snapshots are collected in the continuous mode of the plug-in module 310.

Each set of rows includes register values taken from different groups of components on the microcontroller 100. In this example, one set of rows 650 represents power control registers. A second set of rows 652 represents registers in the clock module. A third set of rows 654 represents registers for system timer and other timers. A fourth set of rows 656 represents registers for MCU control. A fifth set of rows 658 represents registers from audio and analog to digital devices. The register values in the different rows may allow power analysis of the microcontroller 100 based on data from different power related components. For example, the power control registers 650 include register data that indicates whether different components are powered up such as the processors, memories, peripherals such as the SPI, and the audio analog-to-digital converter (AU-DADC). The clock module registers 652 include register data of whether different clocks are powered up and operation modes of the AUDADC. The system timer and timer registers 654 show data registers of the system timers and clocks on the chip. The MCU control registers 656 includes data from the voltage regulators, the buck converters, power switches, memories, and other components that are stored in the registers from the CPU 110 in FIG. 1A. The AUD. ADC control registers 658 shows register data from the FIFOs, DMAs, gains and other related registers.

Each of the snapshot columns 620, 622, 624, 626, 628, 630, and 632 include highlighting of cells of registers that changed value from the previous snapshot. In this example, the highlighting may be in a color, such as red, to provide an indicator to a user viewing the spreadsheet 600 of the change in the register data. In the first snapshot column 620, all registers that are changed from the default value in column 612 are highlighted. For example, the memory power status register in the power control register rows 650 for the first snapshot column 620 is highlighted because the value has changed from the default value. The value of the register is not highlighted in subsequent snapshots in columns 622, 624, 626, 628, 630, and 632 because it stays constant. Another example may be a clock enable register (CLOCKEN2STAT) that changes from the default value during the first snapshot in column 620. The value then changes in the second snapshot in column 622, but remains constant in the next two snapshots in columns 624 and 626. The value is then changed in the fifth snapshot in column 628, but remains constant in the sixth snapshot in column 630. The value is then changed in the last snapshot in column 632.

The data collected by the evaluation tool 300 may be analyzed to determine the cause of abnormal power consumption. For example, the spreadsheet 600 may show that the user software leaves on certain peripherals or memory at initialization and does not turn off such peripherals during operations, thus causing excessive power consumption. Another example is reviewing data from the CFG (Configuration register) that determines several critical AUDADC operation modes. One bit named "RPTEN" from the register determines whether the AUDADC works in repeating scanning mode. If this bit is incorrectly set, the system power may spike because the AUDADC keeps working in the repeating scanning mode. The example evaluation tool may allows determination of larger power consumption then expected on keyword detection in user software. Even given complexity of the user software the example power tool may quickly identify several issues such as a wrong ADUADC mode and wrong PDM settings along with several other fixes. The ending results from correcting settings are more aligned with the calculated power consumptions in the specification. The overall power consumption was reduced by about 45% in this example after corrected settings were applied.

Figure 7:
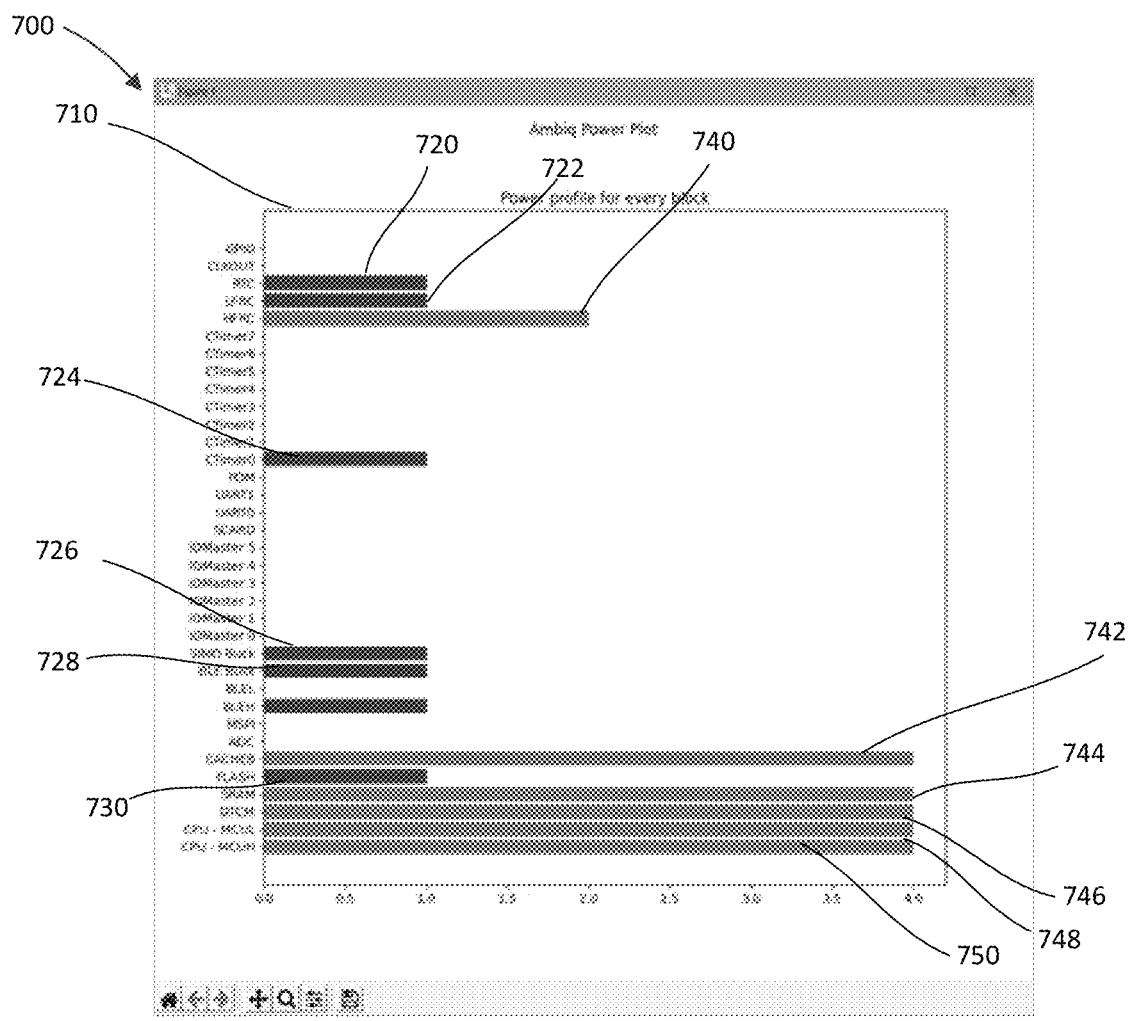
FIG. 7 is a screen shot of an interface generated by the system in FIG. 3 showing different power profiles in a snapshot of the system in FIG. 1.

FIG. 7 is a screen image of an interface 700 generated by the tool 300 in FIG. 3 showing different power profiles of the microcontroller 100 in FIG. 1. The interface 700 displays a graph 710 that corresponds to the power profiles for each power block in the microcontroller 100 derived from a single snapshot. Power consumption is derived from the register data and is displayed via bars that are scaled for each of the power blocks. In this example, the values of the bars are shown in relative numbers. The bars may be color coded to indicated medium and high power consumption. In this example, the power blocks include the GPIO, the clock output, the RTC, reference circuits, different timers, UARTs, input/output masters, the SIMO Buck converter, a BLE buck converter, the ADC, caches, flash memory, SRAM, and CPUs. In the example graph 710 certain components such as the RTC, low frequency reference circuit, timer, SIMObuck converter, BLE buck converter and BLE high voltage source, and flash memory are consuming medium amounts of power as shown by bars 720, 722, 724, 726, 728, and 730. The medium power may be defined by a scaled range between 0.5 and 1.0 in this example. The bars indicating medium power may be colored in a specific color, such as blue, to further highlight them to the user.

Other power blocks such as the high frequency reference circuit, the cache, SRAM, the DTC Memory, and CPUs are consuming high amounts of power as shown by bars 740, 742, 744, 746, 748, and 750 respectively. The high power may be defined by a scaled range between 3.5 and 4 in this example. The bars indicating high power may be colored in a specific color such as red to further highlight them to the user.

The example tool is non-invasive (e.g., not disruptive) of software provided by the chip user executed by the microcontroller 100. The tool 300 allows for dynamic debugging. The disclosed tool requires minimum resources for the plug-in module. Several kilobytes of memory are enough to store information before streaming the sequence data out. The debugging information may also be stored into flash memory on chip. The modules of the example tool provide automatic parsing of the complex register readings and allow graphic display of the results. The interface may facilitate software/validation engineers by obviating the need to reference complex datasheets relating to the chip. The data allows software/validation engineers to focus on the application layer for power analysis.

In this example, the data modules of the example tool are all Representational State Transfer (REST) API ready and may support cloud-based remote deployment and diagnostics. The recommended settings of the tool may be tailored to a user application that may be ported to the system on chip. This can be done by manually or can be done via an AI powered user input matrix. The data collected by the tool may be used as a benchmarking tool to identify faulty chips at the user end. The collected data from numerous devices may be published to provide the expected profiling values of different components on the chip. The interface may also include a checkbox user interface to automatically generate recommended/optimized settings for different on chip components for a user to approve before implementation.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method of determining power data of a system on a chip, the method comprising:
   providing a plug-in module for installation on the chip;
   activating the plug-in module to take a plurality of snapshots of the data in power related registers of components on the chip at predetermined time intervals during a certain time period, when user provided software is executed on the system on a chip, wherein each of the plurality of snapshots includes data from the same power related registers of the components, and wherein the components are organized in power blocks and wherein the registers include data on whether a power block is turned on, a clock speed, and a mode setting; and
   streaming the collected data to an external computing device.

2. The method of claim 1, further comprising displaying the collected data on the external computing device.

3. The method of claim 2, wherein the displaying includes receiving the streamed collected register data via a data parser module.

4. The method of claim 2, wherein the displaying is performed via a display module, wherein the display module is one of: a spreadsheet generator module creating a spreadsheet of the collected register data; or an interface module displaying a graph of power consumption from the collected register data.

5. The method of claim 3, wherein data parser converts the collected data in one of a binary data format or a JSON format.

6. The method of claim 4, wherein the spreadsheet groups the register data of the snapshot by component groups.

7. The method of claim 4, wherein the spreadsheet includes the register data collected from each of the plurality of snapshots.

8. The method of claim 7, wherein changes in register values between snapshots are highlighted on the spreadsheet.

9. The method of claim 4, wherein the interface generator generates a graphic representation of power consumption by components based on the collected register data of the snapshot.

10. The method of claim 1, wherein the user provided software accesses an API call to activate the plug-in module.

11. The method of claim 1, wherein the register data includes at least one of whether a component is turned on, clock rate, clock speed, power mode, or power measurements.

12. The method of claim 1, wherein the streaming is performed via a serial port.

13. The method of claim 1, wherein the collected register data is streamed to the external computing device when the plug-in module collects the snapshot.

14. The method of claim 1, further comprising storing the snapshot in a memory on the system on chip and wherein the collected register data is streamed to the external device from the memory.

15. The method of claim 14, further comprising erasing the collected register data stored in the memory after streaming the collected register data.

16. The method of claim 15, further comprising:
   identifying a mode setting on a component on the chip based on the collected data; and
   adjusting the mode setting to reduce power consumption of the component.

17. The method of claim 16, wherein the component is an audio output device.

18. A method of determining power data of a system on a chip, the method comprising:
   providing a plug-in module for installation on the chip;
   activating the plug-in module to take a plurality of snapshots of the data in power related registers of components on the chip at predetermined time intervals during a certain time period, wherein each of the plurality of snapshots includes data from the same power related registers of the components, and wherein the components are organized in power blocks and wherein the registers include data on whether a power block is turned on, a clock speed, and a mode setting;
   streaming the collected data to an external computing device; and
   displaying the collected data on the external computing device.

19. The method of claim 18, wherein the displaying the collected data includes at least one of displaying the data in a spreadsheet displaying a graph of power consumption of the components.

20. A method of displaying power data of a system on a chip, the method comprising:
   receiving a plurality of snapshots from a plug-in module installed on the chip, wherein each of the plurality of snapshots are taken at predetermined time intervals during a certain time period and each includes data in the same power related registers of components on the chip at a time of the snapshot, and wherein the components are organized in power blocks and wherein the registers include data on whether a power block is turned on, a clock speed, and a mode setting; and
   displaying the collected data on the external computing device.

* * * * *